United States Patent
Kant et al.

[11] Patent Number: 6,128,164
[45] Date of Patent: Oct. 3, 2000

[54] BASEPLATE DESIGN FOR THE ARM AND SUSPENSION ASSEMBLY FOR MINIMAL GRAM-FORCE AND Z-HEIGHT VARIATION

[75] Inventors: Rishi Kant, Boulder; Frederick M. Stefansky, Louisville, both of Colo.

[73] Assignee: Seagate Technology, Inc., Scotts Valley, Calif.

[21] Appl. No.: 09/047,591

[22] Filed: Mar. 25, 1998

Related U.S. Application Data

[60] Provisional application No. 60/048,445, Jun. 27, 1997.

[51] Int. Cl.$^7$ .................................................... G11B 21/16
[52] U.S. Cl. .......................................................... 360/244.5
[58] Field of Search ...................... 360/104, 105, 360/106, 244.5, 244.6; 29/603.03, 522.1

[56] References Cited

U.S. PATENT DOCUMENTS

| | | | |
|---|---|---|---|
| 5,187,626 | 2/1993 | Hopkins et al. | 360/104 |
| 5,717,545 | 2/1998 | Brooks, Jr. et al. | 360/104 |

FOREIGN PATENT DOCUMENTS 6-259907  9/1994  Japan .

*Primary Examiner*—David Davis
*Attorney, Agent, or Firm*—Jonathan E. Olson; Shawn B. Dempster; Edward P. Heller

[57] ABSTRACT

A disk drive having a novel head-gimbal assembly (HGA) which is attached to an actuator arm of an actuator assembly. The HGA includes a read/write head, a flexure, and a suspension arm. The suspension arm has a first end including the flexure supporting the read/write head, and a second end including a hole having an attached swaging member extending through it. The swaging member includes a baseplate and a swaging boss which interface at an annulus region. A circular hole is formed through a top surface of the baseplate and extends downward partially through the swaging member. A non-circular hole, concentric with the circular hole, is formed through a bottom surface of the swaging boss, and extends upward partially through the swaging member. The non-circular hole has a smaller diameter than the circular hole. The shape of the non-circular hole may be any geometric shape such as a two-lobbed swaging hole, a three-lobbed swaging hole, an elliptical hole or a hexagonal hole. The swage boss of the swaging member is inserted into an opening in the actuator arm. A compatible non-circular key, which is a rod of the same configuration and size as the non-circular hole, is inserted through the hole and non-circular hole in the swaging member. The non-circular key is held at both ends by a fixture and turned so that the non-circular hole is deformed. The swage boss expands in size to form a tight interference fit with the actuator arm. The plastic deformation of the swaging member is located at an interface region between the baseplate and the swaging boss. Since the plastic deformation is confined to the interface region, any formation of kinematic deflections on the HGA due to the mounting process is eliminated.

13 Claims, 9 Drawing Sheets

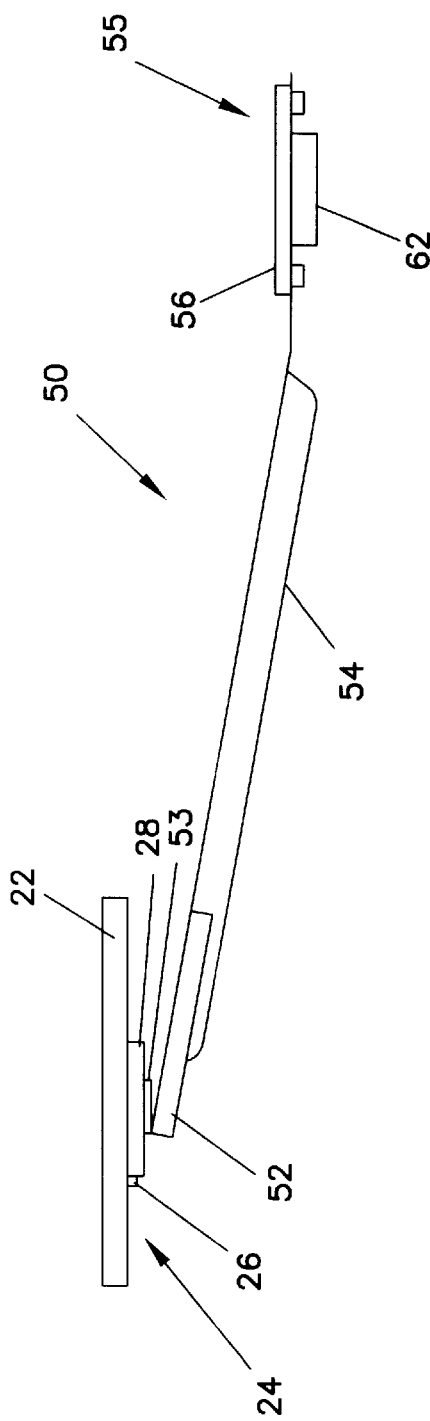
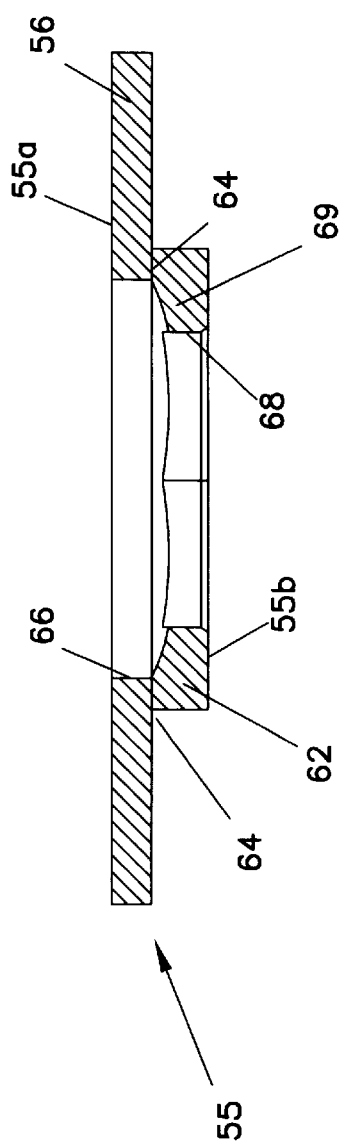
FIG. 7
FIG. 8

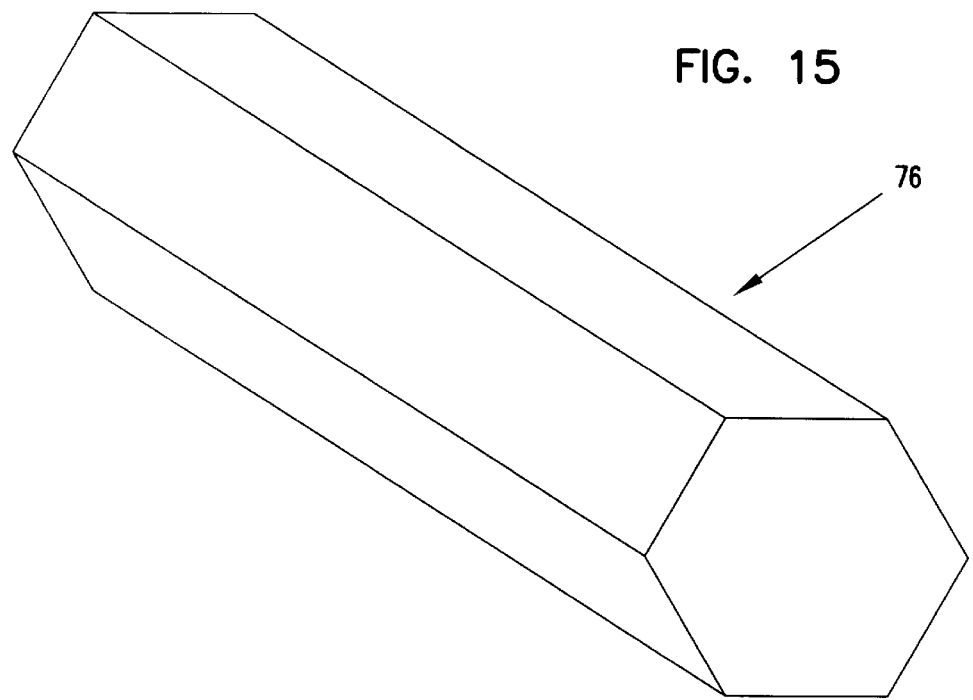
FIG. 15
FIG. 16
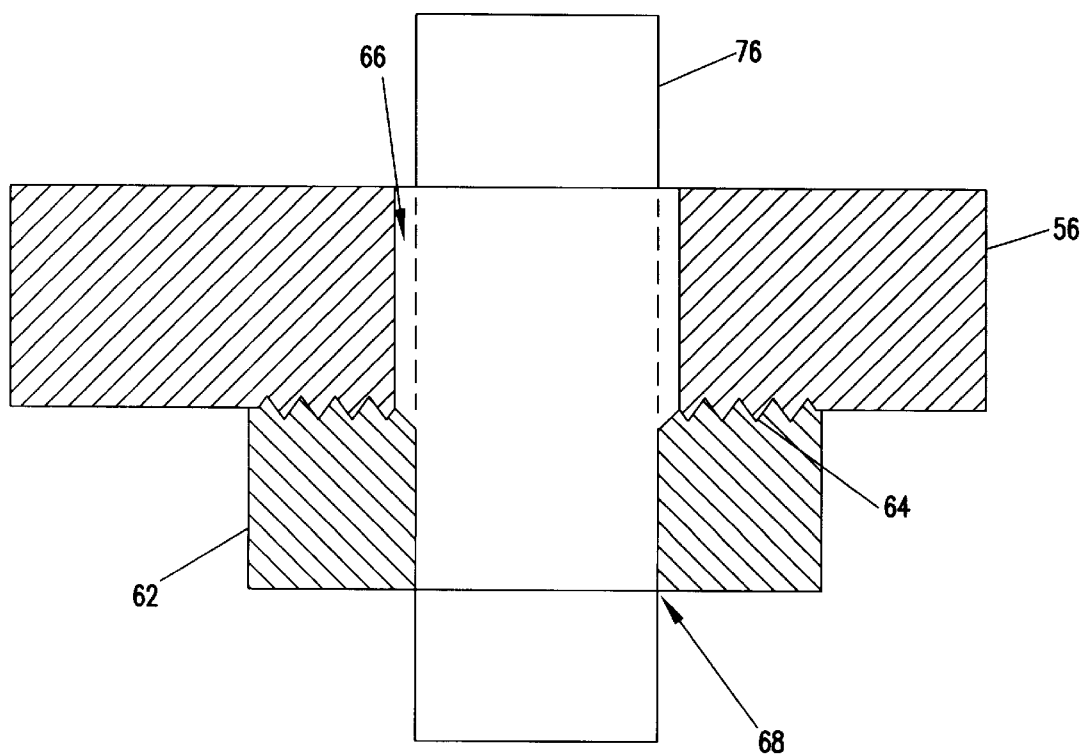

BASEPLATE DESIGN FOR THE ARM AND SUSPENSION ASSEMBLY FOR MINIMAL GRAM-FORCE AND Z-HEIGHT VARIATION

CLAIM OF PRIORITY

This application claims the benefit of U.S. Provisional Application Ser. No. 60/048,445 filed on Jun. 27, 1997.

BACKGROUND OF THE INVENTION

1. Field of the Invention

The present invention relates to disk drives, and in particular to a head-gimbal assembly which is mounted on an actuator arm by a novel swaging process.

2. Description of Related Art

Conventional disk drives for use in workstations, personal computers, and portable computers are required to provide a large amount of data storage within a minimum physical space. In general, Winchester type disk drives operate by transferring data between read/write transducing heads and one or more rotating magnetic storage disks. Positioning of the heads at the desired location over respective data tracks on the disk is accomplished by an actuator assembly coupled to control electronics. The electronics control rotation of the disk, positioning of the actuator assembly and the read/write functions of the heads.

Greater demands are being placed on disk drives by (1) the use of multi-user and/or multi-tasking operating systems, (2) workstations which provide an operating environment requiring the transfer of large amounts of data to and from a hard disk and/or large numbers of disk accesses to support large application programs or multiple users, (3) the present popularity of notebook and laptop computers, and (4) the continuing trend toward higher performance microprocessors. All such systems require a hard drive having high capacity storage capability, which minimizes destructive contact between the head and disk.

Since disk drives will most likely remain the primary memory device in computer applications, disk drives will require greater storage capacities, while at the same time becoming smaller, faster and less expensive. These changes will mean greater emphasis on lower flying heights for heads, higher data transmission speeds, and lower costs of disk drive assemblies. In order to accommodate these demands, the suspension arm of the head-gimbal assembly (HGA) must have low friction and stresses at its interface with the actuator arm in a disk drive. Suspension assemblies will become more precise and an important part of the essential high speed data transmission path. To this end, there is a need for an improved method of mounting a head-gimbal assembly on an actuator arm which eliminates formation of kinematic deflections due to the mounting process. Kinematic deflections cause the heads to fly at different heights thus effecting the precision and high performance of the suspension assemblies in the disk drive.

A HGA consists of a read/write head attached to a suspension assembly. A suspension assembly holds the read/write head in position while pressing it towards the disk surface with a precise force applied in a precisely determined location. The head flies above the disk at a height established by the equilibrium of the suspension force and the increasing force of the air stream under the head as the head nears the disk. Any twist (torque) imparted by the suspension to the head will affect the flying height, as will variations in the position of the applied force. It is therefore important for head and suspension designers to seek the optimal combination of force, location and twist which will produce the desired flying height, greatest stability and greatest immunity to disturbances.

An important determinant in establishing a stable head and suspension assembly is the swaging process. The swaging process is a method for mounting the HGA on the actuator arm of an actuator assembly. In a conventional swaging process as shown in FIGS. 1–3, a swage boss 2 on a baseplate 4 welded to an suspension arm (not shown) of the HGA is placed in a hole 6 of an actuator arm S. A steel ball 10 having a diameter which is slightly larger than swage boss hole 7 in the swage boss 2, is pressed through a baseplate hole 5 and swage boss hole 7. During the swaging process, the swage boss 2 and the baseplate 4 deform plastically to form a press fit at 12 with the actuator arm 8.

While conventional swaging processes are cost effective, these processes cause the actuator arm and the baseplate on the HGA to permanently deform which results in variations in the "z-height" and gram load. The z-height 14, as shown in FIG. 4, is the vertical distance between the disk surface 16 and the actuator arm 18 on which the baseplate of the HGA is mounted. The z-height variations resulting from conventional swaging processes adversely affect the uniformity of the flying height at respective head/disk interfaces. As multiple HGA's are assembled with other components into a head stack assembly, and as the industry transitions to smaller form factors, the variations in the z-height are likely to further exacerbate the problem of achieving a stable suspension assembly.

It is believed that the variation in the z-height occurs due to the application of a large force (usually 170–200 lbs.) applied in a direction perpendicular to the actuator arm during the swaging process. Due to the force in the swaging process, the spring characteristics of the suspensions change, thereby creating a change in the gram load and the z-height. The gram load is the measure of the force exerted by the suspension on the disk via the slider which supports the transducer. Furthermore, swaging is a dynamic process in which a situation of direct impact prevails and causes continuous distortion as the swaging ball moves from one swage boss to the another swage boss in a stack assembly. Direct impact is a collision between two bodies where relatively large forces result over a comparatively short interval of time. The bodies travel towards each other on a line joining their centers of mass. In the swaging process, the swaging ball initially directly impacts the first baseplate on an arm and upon exiting it, impacts the next baseplate at a high speed with a high kinetic energy. The high kinetic energy is absorbed in the deformation of the baseplate and the actuator arm. The situation repeats itself as the swaging ball impacts the second arm, third arm and so on. If both of these problems are eliminated, the integrity of the final head stack assembly would be greatly enhanced.

Apart from the high precision and equilibrium demands of mounting the HGA to the actuator arm, it is required that the actuator arm and suspension arm of the HGA are able to withstand a minimum torque of magnitude 20 oz.-in. at the interface between them. This is the torque necessary to disassemble the HGA from the actuator arm. The actuator arm and suspension arm must not experience permanent plastic deformation during the swaging process because there must be the capability to rework the assembly for troubleshooting and repair purposes. Plastic deformation implies a loss of "elasticity" of the material due to the absorption of kinetic energy during the swaging process. Plastic deformation of the actuator arm will produce a permanent change in the arm resulting in a reduction of the retention force exerted by the actuator arm on the baseplate. This creates an undesirable effect on the swaging of a reworked actuator arm. Therefore, it is imperative that the residual stress levels at the interface of the swage boss and actuator arm not exceed the yield limit of the actuator arm material.

SUMMARY OF THE INVENTION

It is therefore an advantage of the present invention to provide a head-gimbal assembly capable of being mounted on an actuator arm which produces minimal gram-force and z-height variation.

It is another advantage of the present invention to provide a head-gimbal assembly with a baseplate having a swage boss with a non-circular hole.

It is still a further advantage of the present invention to provide a method of mounting the head-gimbal assembly to the actuator arm by swaging.

It is another advantage of the present invention to provide a swaging process wherein a non-circular rod is inserted into a non-circular hole of the swage boss and twisted.

It is a further advantage of the present invention to provide a swaging process which ensures uniform swaging conditions throughout the head stack assembly.

It is still a further advantage of the present invention to provide a swaging process which eliminates the variations in the mounting process for the tension ("up") and compression ("down") swaging members.

It is another advantage of the present invention to provide a single stage process which is cost effective, efficient and reliable.

It is yet another advantage of the present invention to provide a swaging process where the actuator arm and baseplate do not deform plastically so that the assembly may be disassembled and reworked.

It is still a further advantage of the present invention to provide a swaging process where the plastic deformation of a swaging member is confined to a limited area.

These and other advantages are provided by the present invention, which in the preferred embodiment relates to a new and improved head-gimbal assembly and method for attaching the head-gimbal assembly to the actuator arm. In the preferred embodiment, the head-gimbal assembly includes a read/write head, a flexure, and a suspension arm. The suspension arm has a first end including the flexure supporting the read/write head, and a second end including a hole having an attached swaging member extending through it. The swaging member includes a baseplate and a swaging boss. The interface between the baseplate and swaging boss is called an annulus region. On the swaging member, a circular hole is formed through a top surface of the baseplate, extending downward partially through the swaging member and reaching the annulus region. A non-circular hole, concentric with the circular hole, is preferably formed through a bottom surface of the swaging boss, extending upward partially through the swaging member. The non-circular hole has a smaller diameter than the circular hole, and the circular and non-circular holes meet on opposing sides of a tapered boundary region between the two holes. The tapered boundary region begins tapering at the annulus region until it reaches the non-circular hole. The shape of the non-circular hole may be any geometric shape such as a two-lobbed swaging hole, a three-lobbed swaging hole, an elliptical hole or a hexagonal hole.

During assembly, the swage boss of the swaging member is inserted into an opening in the actuator arm. A compatible non-circular key, which is a rod of the same configuration as the non-circular hole of the swaging member, is inserted through the hole and non-circular hole in the swaging member. The diameter of the circular hole in the baseplate is larger than the perimeter of the non-circular key so that the non-circular key does not touch the hole of the baseplate. With the actuator assembly held stationary, the non-circular key is inserted through the noncircular hole and in proximate contact with the swage boss. The non-circular key is held at both ends by a fixture and turned so that the non-circular hole is deformed, and the swage boss expands in size to form a tight interference fit with the actuator arm. The plastic deformation of the swaging member is confined to the limited area of the annulus region.

BRIEF DESCRIPTION OF THE DRAWINGS

The present invention will now be described with reference to the drawings, in which:

FIG. 7 is a side view of head-gimbal assembly including an attached baseplate according to the present invention;

FIG. 8 is a side view of the baseplate and swage boss according to the present invention;

FIG. 15 is a perspective view of non-circular key having a hexagonal shape according to the present invention;

FIG. 16 is a side view of the non-circular key inserted into the baseplate and swage boss according to the present invention.

DETAILED DESCRIPTION OF THE PREFERRED EMBODIMENTS

The present invention will now be described with reference to FIGS. 5 through 17 which in general relate to a head gimbaling assembly having a novel suspension arm mounted on an actuator arm in a disk drive. The disk drive described herein includes a hard disk assembly incorporating various numbers of hard disks and utilizing Winchester technology. It is understood that the disk drive of the present invention may utilize other types of disks, for example, optical disks, and other read/write technologies, such as for example lasers. In a preferred embodiment, the present invention may be utilized in a so-called 3.5 inch form factor disk drive, which includes hard disks having a diameter of approximately 3.5 inches. However, it is understood that the present invention may be used with larger or smaller form factor disk drives.

Figure 1:
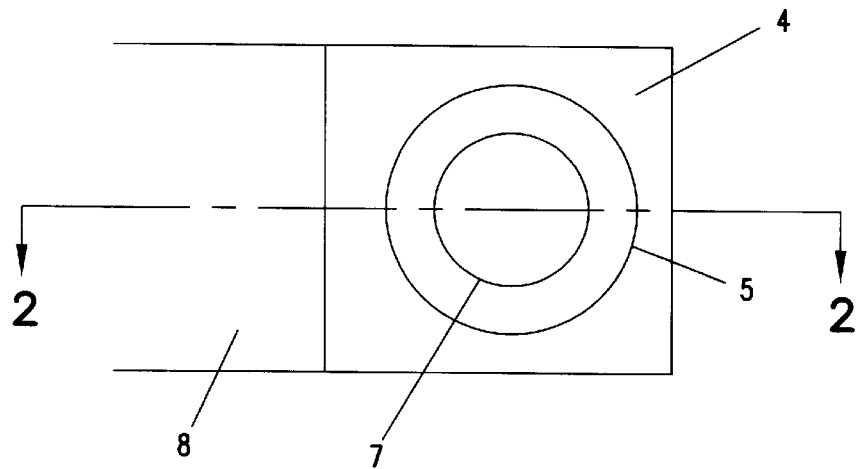
FIG. 1 is a top view of a conventional head-gimbal assembly mounted on an actuator arm.
Figure 2:
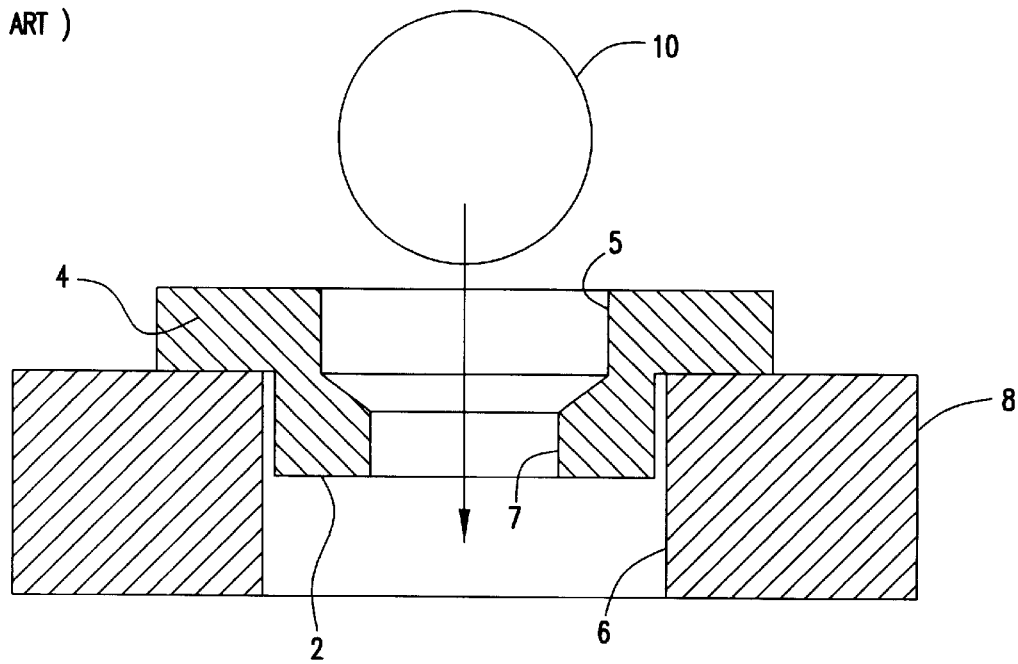
FIG. 2 is a cross-sectional side view of the conventional head-gimbal assembly mounted on the actuator arm before a swaging process through line 2—2 of FIG. 1.
Figure 3:
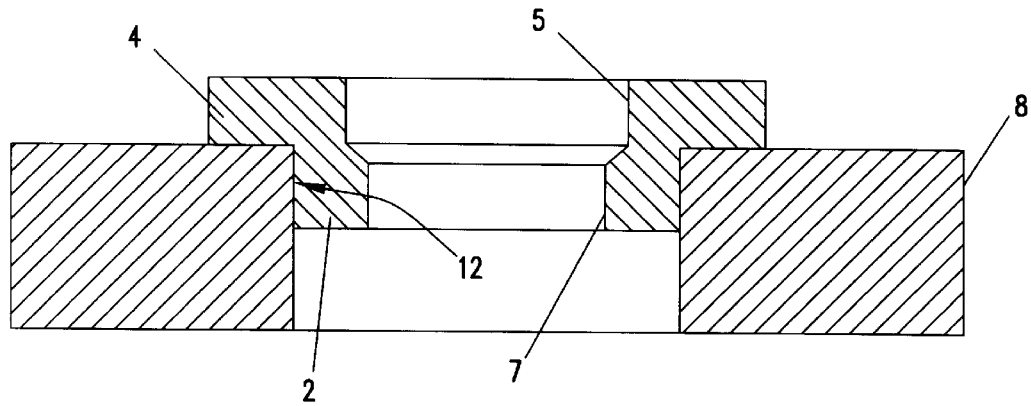
FIG. 3 is a side view of the conventional head-gimbal assembly mounted on the actuator arm after the swaging process illustrating the press fit.
Figure 4:
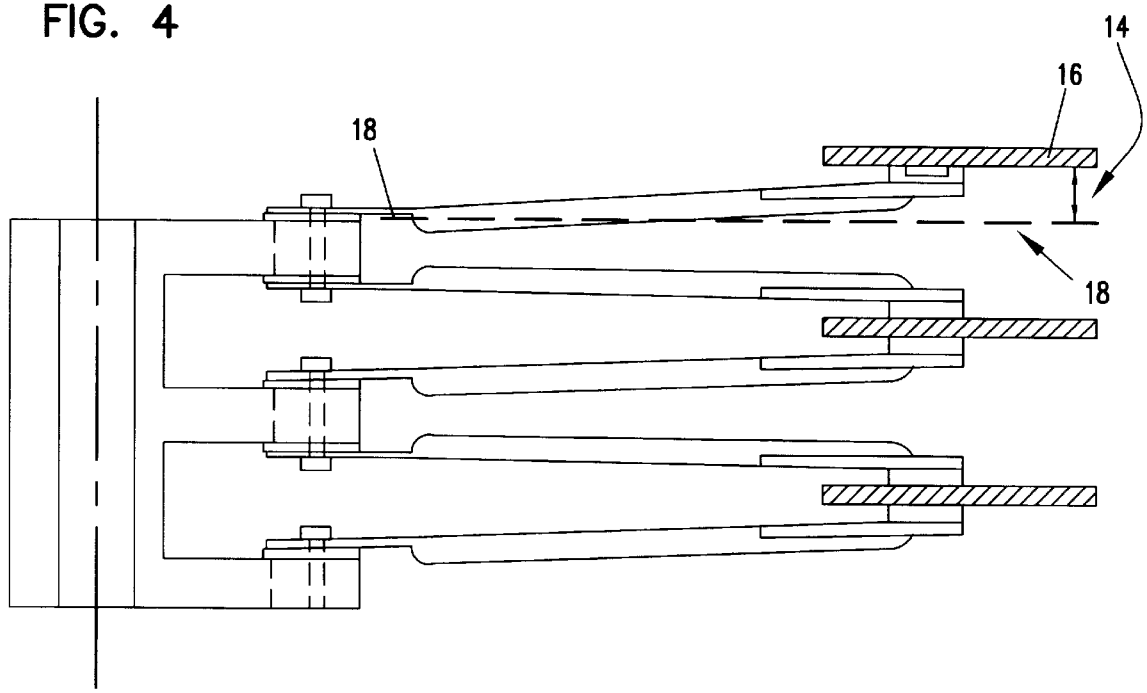
FIG. 4 is a side view of the head-gimbal assembly illustrating the z-height.
Figure 5:
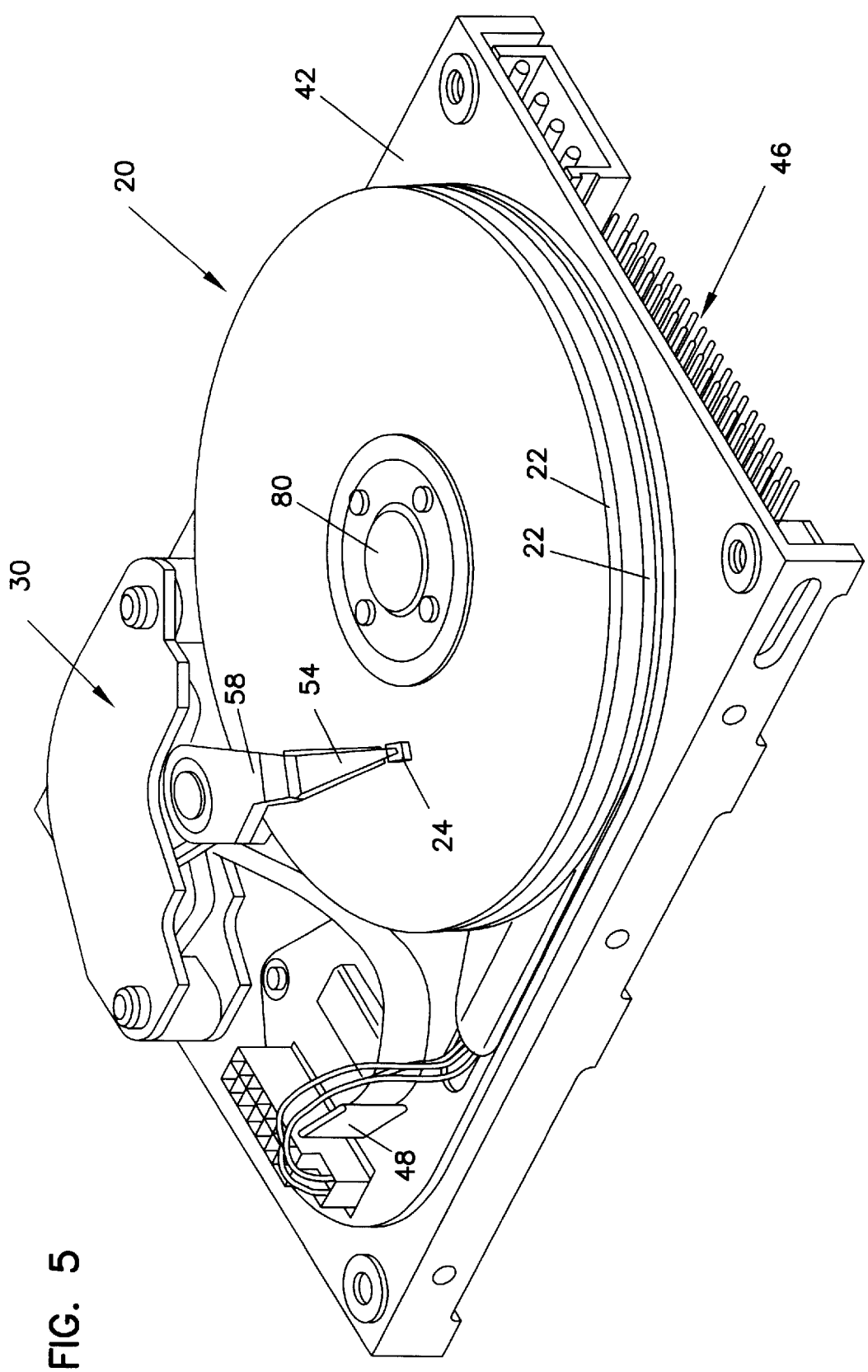
FIG. 5 is a perspective view of the disk drive according to the present invention.
Figure 6:
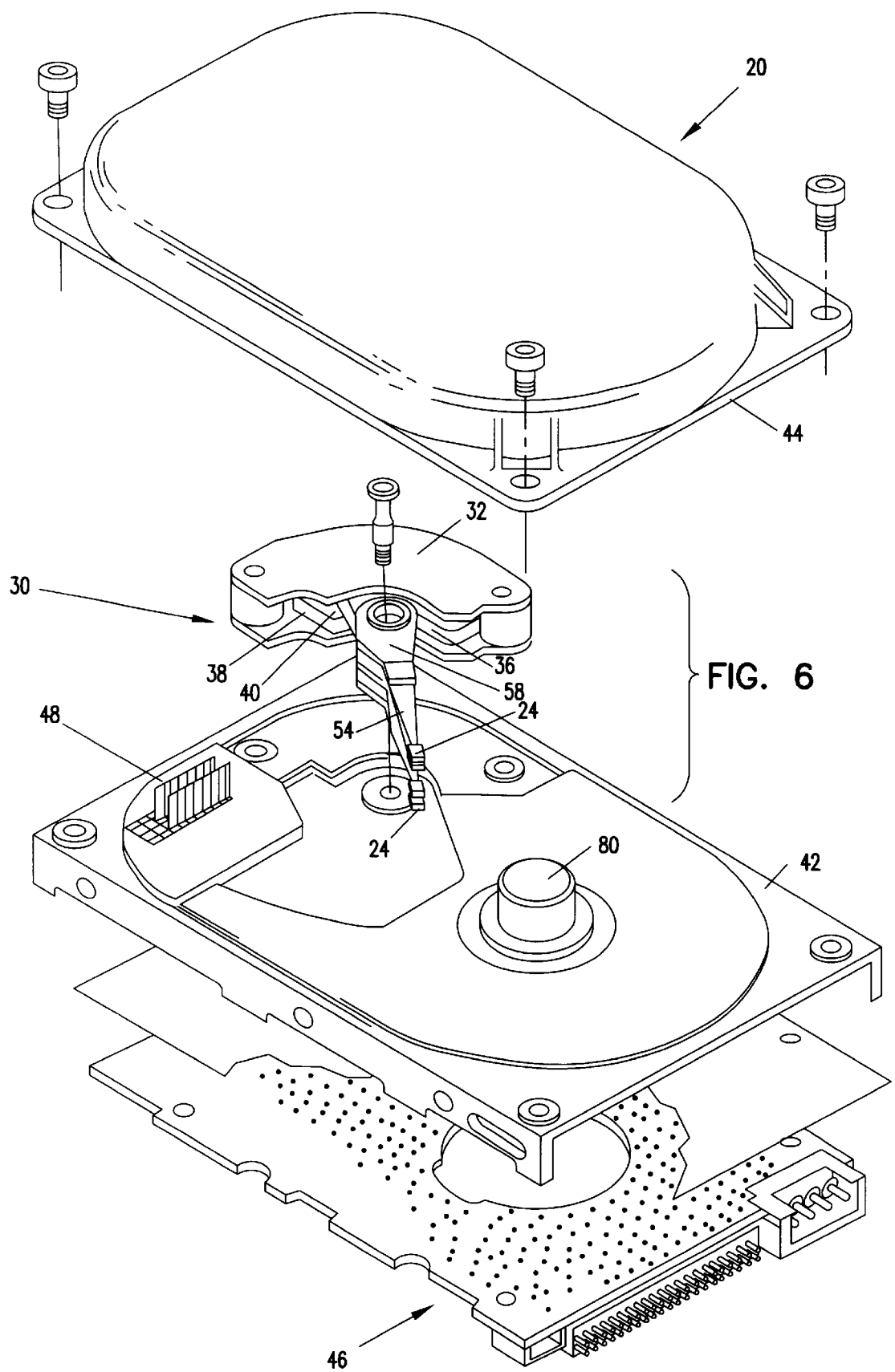
FIG. 6 is an exploded perspective view of the disk drive according to the present invention.
Figure 9:
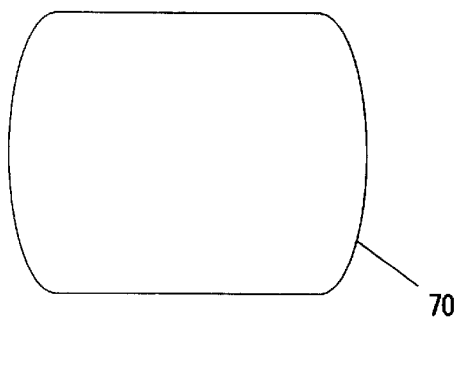
FIG. 9 illustrates a two-lobbed non-circular hole according to the present invention.
Figure 10:
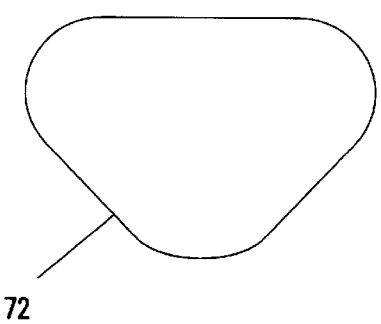
FIG. 10 illustrates a three-lobbed non-circular hole according to the present invention.
Figure 11:
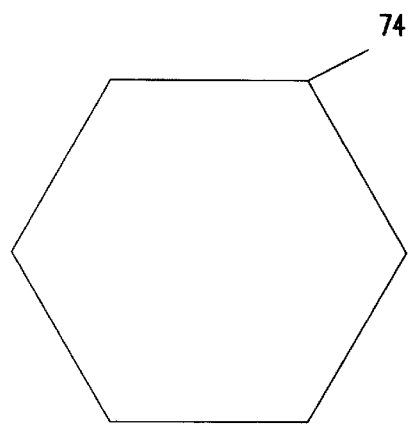
FIG. 11 illustrates a hexagonal non-circular hole according to the present invention.
Figure 12:
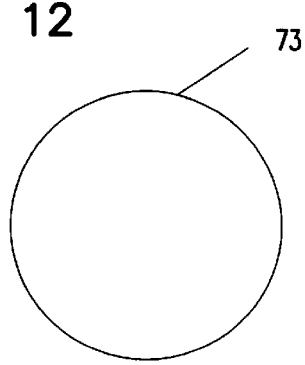
FIG. 12 illustrates an elliptical non-circular hole according to the present invention.

Referring now to FIGS. 5 and 6, there is shown a disk drive 20 including a plurality of hard disks 22 and a plurality of read/write heads 24, one head 24 per disk surface. Each read/write head 24 includes a transducer 26 mounted to a slider 28 (See FIG. 7). The slider 28 is in turn supported on an actuator assembly 30 explained in greater detail below. The heads 24 may utilize inductive transducers, such as for example those manufactured by Seagate Technology, 2720 Orchard Parkway, San Jose, Calif. 95134 or Read-Rite, 345 Los Coches, Milpitas, Calif. It is understood that the type of read/write transducer used is not critical to the present invention, and other head technologies, such as magneto-resistive (MR) transducing elements, may be used in alternative embodiments of the invention.

The actuator assembly 30 is pivotally mounted so as to pivot around an axis 32 in response to a force exerted on the actuator assembly by voice coil motor at a back end of the actuator assembly. The voice coil motor may include a voice coil 36 mounted between a pair of arms 38 extending from the actuator assembly, and one or two permanent magnets 40 mounted above and/or below the voice coil. It is understood that the configuration of the voice coil motor is not critical to the present invention, and may vary in alternative embodiments. For example, although a rotary actuator is disclosed, the present invention may operate with a linear actuator in alternative embodiments.

As is known in the art, during operation of the drive 20, disks 22 are rotated by spin motor 80 and actuator assembly 30 pivots the read/write heads 24 across the surfaces of the disks so that data is transferred between the read/write heads and the disks in a plurality of concentric data tracks. Slider 28 includes a pair of rails (not shown) along the length of the slider, which rails are provided to support the transducers on an air bearing a small distance above the surface of the disks 22 as the disks rotate. In a preferred embodiment, each of the heads may have a flying height of between one to four micro inches, and optimally about 1.5 micro inches.

The above-described head and disc assembly ("HDA") may be mounted within a base 42 and cover 44 forming an enclosure of known construction to shield the HDA against particulates in the surrounding environment. Control electronics 46 may be affixed to the enclosure and connected to the HDA via a conventional header 48. The control electronics may be used to control rotation of the disks, positioning of the actuator assembly, and transfer of information between the transducers and the disks.

Referring now to FIG. 7, in addition to the voice coil motor, the actuator assembly 30 according to the present invention includes a head-gimbal assembly ("HGA") 50. The HGA 50 consists of the read/write head 24, a flexure 52, and a suspension arm 54. In particular, read/write head 24 is supported on flexure 52, which is in turn mounted on suspension arm 54. Also, swaging member 55 is attached to the suspension arm 54 at the end opposite of the read/write head 24. The suspension arm 54 is mounted on an actuator arm 58 via the swaging member 55 as explained hereinafter. The suspension arm 54 is provided to exert a force or load to bias the read/write head 24 toward the surface of disk 22. During operation of the drive, the force of the suspension arm 54 opposes and counterbalances the force of the cushion of air under the slider so that the read/write head reaches an equilibrium state at the desired flying height. The suspension arm 54 may be formed of a rigid lightweight material such as, for example, aluminum, and may be formed by casting or machining. It is understood that other materials may be used for the suspension arm, such as various polymers, aluminum alloy and other materials, and that the suspension arm may be formed by processes other than casting or machining.

It is an important function of flexure 52 to provide a gimbaling action which allows the read/write head 24 to fly flat over the disk, i e, to orient the surface of the read/write head 24 so that it is generally parallel to the disk while the disk is rotating. Toward this end, flexure 52 typically includes a tongue 53 provided at an angle with respect to the main body of flexure (FIG. 7). The angle of the tongue with respect to the flexure is provided to compensate for the angle that the suspension arm 54 forms with respect to the disk surface. When read/write head 24 is mounted to the flexure tongue 53, the read/write head 24 is generally parallel to the surface of the disk 22. The flexure 52 is preferably formed of a sheet of thin, flexible stainless steel, cut from sheet stock. It is understood that the flexure may be formed from other materials, such as for example aluminum or aluminum alloy, and by other processes. The width of the flexure is preferably similar to or less than the width of the suspension arm.

Figure 14:
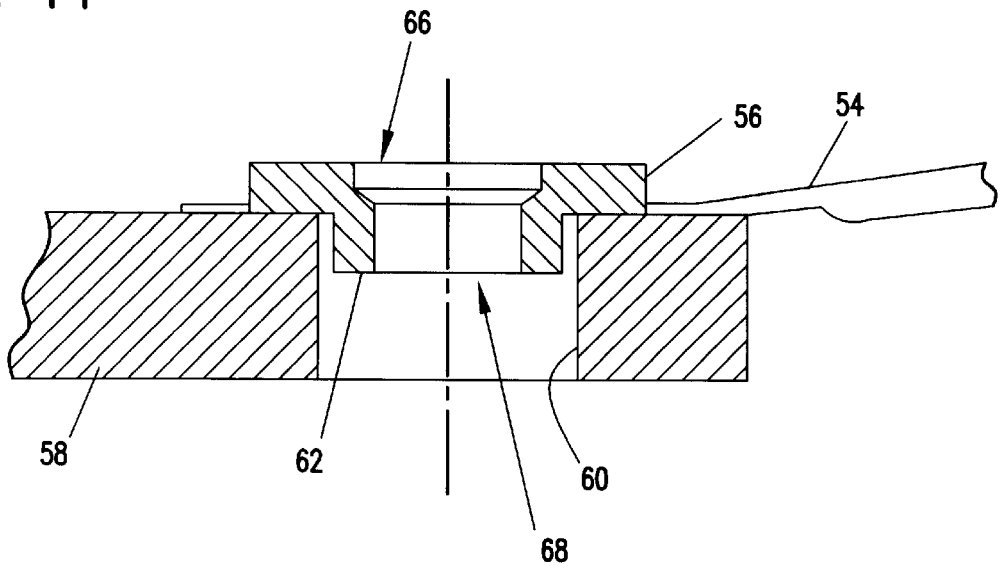
FIG. 14 is a cross-sectional side view of the head-gimbal assembly mounted on the actuator arm before a swaging process through line 14—14 of FIG. 13 according to the present invention.

With reference now to FIGS. 7, 8 and 14, the swaging member 55 includes an integrally formed baseplate 56 and a swage boss 62. It is understood that the baseplate and swage boss may alternatively be individual components which are attached to each other after their formation. The interface area between the swage boss 62 and the baseplate 56 is called an annulus region 64 and is the area of concentrated dislocation, as explained hereinafter. The baseplate is preferably thin, with ends which overlie the suspension arm 54, and is used to attach the swaging member 55 to the suspension arm 54, as by the welding of the baseplate ends to the suspension arm. It is understood that the baseplate may be affixed to the suspension arm by other known fastening methods.

The swage boss 62 is provided on the bottom of the baseplate 56 (as viewed in FIG. 8), and extends through a first opening formed in the suspension arm, and partially through a second opening 60 formed in the actuator arm 58 (as viewed in FIG. 14). The swage boss 62 may fit loosely through the first opening, but preferably fits snugly within the second opening 60 in the actuator arm. In a preferred embodiment, the swage boss 62 and second opening 60 may each have a circular footprint, but the shape of the swage boss and second opening may vary together in alternative embodiments of the invention.

A circular hole 66 is preferably formed through a surface 55a of the swaging member 55, extending downward (as viewed in FIG. 8) partially through the swaging member until it reaches the annulus region 64. A non-circular hole 68, concentric with hole 66, is preferably formed through a surface 55b of the swaging member, extending upward (as viewed in FIG. 8) partially through the swaging member until it reaches a tapered boundary region 69. The noncircular hole 68 has a smaller diameter than the circular hole 66, and the holes 66 and 68 preferably meet on opposing sides of the tapered boundary region 69 between the two holes. The tapered boundary region 69 begins tapering at the annulus region 64 until it reaches the non-circular hole 68. It is understood that the tapered boundary region is not critical to the present invention and is included in the swaging member in order to simplify the fabrication process. Moreover, the circular hole and the non-circular hole may meet at varying depths in the swaging member, or may immediately attach to each other, in alternate embodiments. The shape of the non-circular hole 68 may be any geometric shape such as a two-lobed swaging hole 70, a three-lobed swaging hole 72, an elliptical hole 73 or a hexagonal hole 74 as shown in FIGS. 9–12, respectively. It is understood that the invention is not limited to the geometries shown in the figures.

Figure 13:
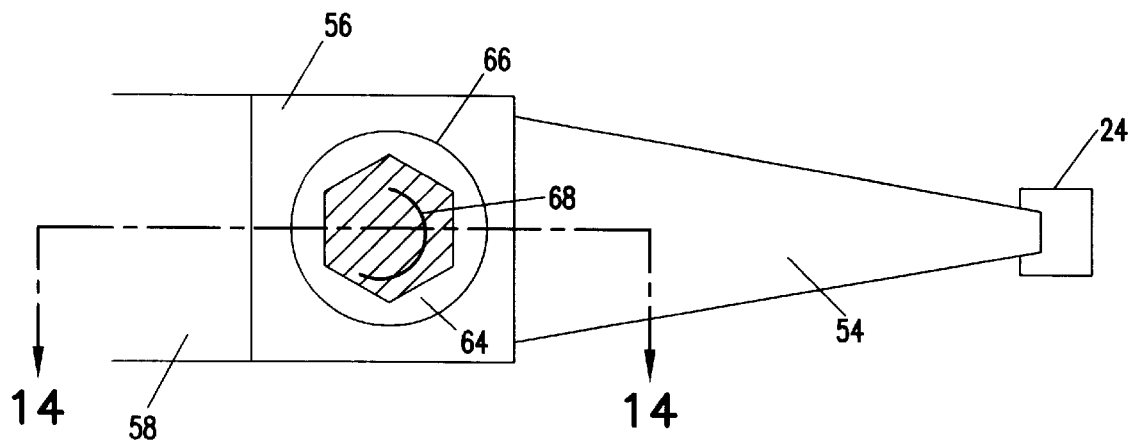
FIG. 13 is a top view of a head-gimbal assembly mounted on an actuator arm according to the present invention.
Figure 17:
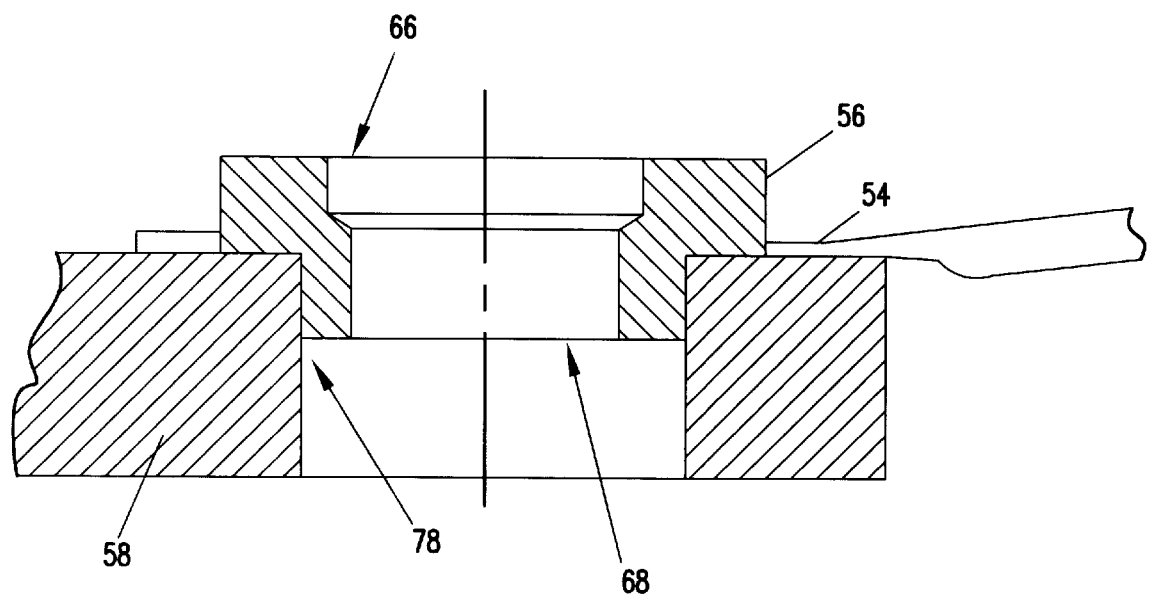
FIG. 17 is a side view of the head-gimbal assembly mounted on the actuator arm after the swaging process illustrating the press fit according to the present invention.

During assembly, the swage boss 62 of the swaging member 55 is inserted into the opening 60 in the actuator arm 58 as shown in FIGS. 13 and 14. The preferred material of the actuator arm is aluminum, such as an aluminum 6063-T6, although it is understood that other materials for the actuator arm may be used. A compatible non-circular key 76 (FIG. 15), which is a rod of the same circumferential size and configuration as the swage boss 62, is inserted through the hole 66 and hole 68 in the swaging member 55 as shown in FIG. 16. The diameter of the circular hole 66 in the baseplate 56 is larger than the perimeter of the non-circular key 76 so that the non-circular key 76 does not touch the hole 66 of the baseplate 56. With the actuator assembly held stationary as explained hereinafter, the non-circular key 76 is inserted through the non-circular hole 68 and in proximate contact with the swage boss 62. The non-circular key 76 is held at both ends by a fixture (not shown) which rotates the non-circular key 76 about its axis with the swage boss held stationary so that the non-circular hole 68 is deformed by the key, and the swage boss 62 expands in size to form an interference fit with the actuator arm 58. It is understood that the configuration of the fixture is not critical to the present invention, and may vary in alternate embodiments. As illustrated in FIG. 17, the deformed portion of the swage boss 62 becomes greater in diameter and forms a press fit relationship with the actuator arm 58 at 78. The configuration of the noncircular key and the swage boss are selected so that the key may be rotated and the swage boss deformed without deforming the actuator arm.

With reference to FIGS. 15 and 16, the non-circular key 76 is preferably formed of a material that is easy to machine, such as an oil quenched cold-work tool made of steel, although it is understood that other materials for the non-circular key may be used. However, the material should be sufficiently hard and rigid in order to ensure that the swage boss, and not the non-circular key, is deformed during the swaging process. The non-circular key is inserted through each swaging member of a head stack assembly before it is twisted. The fixture guarantees accuracy by preventing misalignment and evenly distributing torque among each swaging member during the swaging process.

The HGA 50 according to the present invention provides several advantages. First, the distortion caused by the tension ("up") and the compression ("down") swaging members in the conventional swaging process no longer exists. Previously, swaging members attached to HGAs performing read/write operations on opposed surfaces of the disk were not swaged in an identical manner. As explained in the Background of the Invention section, as the swaging ball is driven through respective swaging members, tensile and compressive forces are exerted on the swaging members perpendicular to the major planar surfaces of the swaging members. These tensile and compressive forces result in inconsistent deformation of the swaging members, as will be explained hereinafter. For the first swaging member in the head stack assembly, the swaging ball impacts the baseplate first and then the swage boss. This swaging member is called the tension swaging member because the tensile force created by the swaging ball tends to elongate the swaging member. For the next swaging member in the head stack assembly, the swaging ball impacts the swage boss first and then the baseplate. This swaging member is called the compression swaging member because the compressive force created by the swaging ball tends to press on the swaging member. As a result of variations in the mounting process for the swaging members and the created distortion, read/write heads operating on opposed surfaces of the disk function differently in the disk drive.

By contrast, the swaging process according to the present invention does not exert forces perpendicular to the major planar surfaces of the swaging members, but rather applies such forces radially outward in the major planar surfaces of the swaging members. The swaging members are able to withstand forces radially within the plane of the swaging members without permanent deformation much more easily than forces that are applied perpendicularly to the planar surfaces. The design of the present invention renders a swaging process which is identical for all swaging members in the head stack assembly, therefore, a stable and uniform performance is achieved by the read/write heads.

Furthermore, by strategically locating the shear surface at the annulus region 64 of the swaging member 55, the plastic deformation of the swaging member 55 due to the swaging process of the present invention is confined to a limited area. Typically, stresses tend to concentrate near the surface that is "failing". Failing occurs when the material being moved permanently loses its elasticity and fails to return to its original shape and form after the removal of an applied force. In the present invention, the material at the annulus region of the swaging member is pushed outward by radial forces. The stresses concentrate in the annulus region because it is the material being moved, and thus failing, during the swaging process. Although stresses may be translated to other areas of the swaging member, the loss of elasticity occurs substantially in the annulus region. The limited amount of plastic deformation and residual stress required to produce the interference fit of the swage boss in the actuator arm of the present invention is generated gradually, and therefore allows the swage boss to locate itself naturally in the hole of the actuator arm. This renders a tight interference fit between the swage boss and the actuator arm, while leaving the baseplate stress free. This also eliminates any kinematic deflections of the suspension arm that would otherwise be caused by residual stresses located at the baseplate and actuator arm interface. Also, the amount of plastic deformation and residual stresses may be varied by simply changing the size of the compatible key. A smaller key will create less deformation because less swage boss material is dislocated.

Moreover, during the swaging process of the present invention, there is no vertical force on the non-circular key 76. The non-circular key is secured at both ends and twisted. Eliminating the vertical force eliminates the possibility for buckling during the swaging process. Buckling occurs only when a large vertical force is applied on the instrument causing the swage boss to expand, as in the prior swaging process where a steel ball was forced through the swage boss. The swaging process of the present invention ensures uniform swaging conditions throughout the stack.

Also, the swaging process in the present invention is a single stage process. Multiple HGAs are secured in place on actuator arms which when assembled form an E-block. A fixture called a shuttle secures the E-Block during the swaging process. The non-circular key is then inserted in the swaging members of the HGAs and twisted in one motion. It is understood that the shuttle is not critical to the present invention, and may vary in alternate embodiments. The swaging process is performed on all swaging members in the assembly at one instantaneous time, instead of consecutively, as done in the prior swaging process.

Moreover, in the present process, the ability to rework the actuator arm 58 and HGA 50 is not compromised in the present invention because the residual stresses do not cause permanent deformation in the actuator arm or baseplate. Once the assembly is reassembled, a precise interference press fit is capable of being formed between the actuator arm and the HGA.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. An actuator assembly for a disk drive, comprising:
   a pivotable actuator arm and
   a head-gimbal assembly comprising:
      a suspension arm having a first end and a second end,
      a flexure attached on the first end of said suspension arm,
      a baseplate attached to the second end of said suspension arm, and
      a swage boss having a non-circular aperture attached to said baseplate, the swage boss being swaged with said actuator arm by twisting a compatible non-circular rod in said non-circular aperture, said non-circular aperture is large enough to receive said compatible non-circular rod there through without deformation, so that said swage boss is swaged by a twisting force with substantially no component in a direction parallel to a central axis through said aperture.

2. An actuator assembly as recited in claim 1, wherein said non-circular aperture of said swage boss is two-lobed shaped.

3. An actuator assembly as recited in claim 1, wherein said noncircular aperture of said swage boss is three-lobed shaped.

4. An actuator assembly as recited in claim 1, wherein said non-circular aperture of said swage boss is elliptical shaped.

5. An actuator assembly as recited in claim 1, wherein said non-circular aperture of said swage boss is hexagonal shaped.

6. An actuator assembly as recited in claim 1, wherein said swage boss is affixed to said actuator arm by inserting said swage boss into an opening in said actuator arm and deforming said swage boss into tight engagement with walls defining said opening by exerting a deforming force on said swage boss, said deforming force having substantially no component exerted in a direction parallel to a central axis through said aperture.

7. A disk drive, comprising:
   a disk;
   a spin motor for rotating the disk;
   an actuator assembly, including:
      an actuator arm capable of pivoting with respect to the disk,
      a head-gimbal assembly attached to said actuator arm for supporting a head on an air bearing over the disk in the disk drive, comprising:
         a suspension arm having a first end and a second end,
         a flexure attached on the first end of said suspension arm,
         a read/write head mounted on said flexure for transferring information between said read/write head and the disk on the disk drive,
         a baseplate attached to the second end of said suspension arm,
         a swage boss having a non-circular aperture attached to said baseplate, said swage boss press fit with said actuator arm by twisting a compatible non-circular rod in said non-circular aperture, said non-circular aperture is large enough to receive said compatible non-circular rod there through without deformation, so that said swage boss is swaged by a twisting force with substantially no component in a direction parallel to a central axis through said aperture, and
      a voice coil for pivoting said actuator arm; and
   a controller for sending signals to said spin motor and said voice coil, and transferring signals to and from said read/write head.

8. A disk drive as recited in claim 7, wherein said non-circular aperture of said swage boss is two-lobed shaped.

9. A disk drive as recited in claim 7, wherein said non-circular aperture of said swage boss is three-lobed shaped.

10. An actuator assembly as recited in claim 7, wherein said non-circular aperture of said swage boss is elliptical shaped.

11. A disk drive as recited in claim 7, wherein said non-circular aperture of said swage boss is hexagonal shaped.

12. An actuator assembly as recited in claim 7, wherein said swage boss is affixed to said actuator arm by inserting said swage boss into an opening in said actuator arm and deforming said swage boss into tight engagement with walls defining said opening by exerting a deforming force on said swage boss, said deforming force having substantially no component exerted in a direction parallel to a central axis through said aperture.

13. A disk drive as recited in claim 7, wherein said compatible non-circular rod is inserted in a direction along an axis through said non-circular aperture without a substantial insertion force, so that after said step of twisting said press-fit relationship has an axial contact force that is independent of said direction of insertion.

* * * * *